US012095507B2

(12) United States Patent
Takeshita et al.

(10) Patent No.: US 12,095,507 B2
(45) Date of Patent: Sep. 17, 2024

(54) MULTI-LAYER NETWORK SYSTEM AND PATH SETTING METHOD IN MULTI-LAYER NETWORK

(71) Applicant: NEC Corporation, Tokyo (JP)

(72) Inventors: Hitoshi Takeshita, Tokyo (JP); Shinsuke Fujisawa, Tokyo (JP); Tomoyuki Hino, Tokyo (JP); Akio Tajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/091,557

(22) Filed: Nov. 6, 2020

(65) Prior Publication Data

US 2021/0058157 A1  Feb. 25, 2021

Related U.S. Application Data

(63) Continuation of application No. 15/537,501, filed as application No. PCT/JP2015/006247 on Dec. 15, 2015, now Pat. No. 10,848,245.

(30) Foreign Application Priority Data

Dec. 24, 2014 (JP) .................................. 2014-259792

(51) Int. Cl.
*H04B 10/275* (2013.01)
*H04B 10/03* (2013.01)
(Continued)

(52) U.S. Cl.
CPC ........... *H04B 10/275* (2013.01); *H04B 10/03* (2013.01); *H04B 10/0795* (2013.01);
(Continued)

(58) Field of Classification Search
None
See application file for complete search history.

(56) References Cited

U.S. PATENT DOCUMENTS

| 5,583,860 A | 12/1996 | Iwakawa et al. |
| 6,026,077 A | 2/2000 | Iwata |
| (Continued) | | |

FOREIGN PATENT DOCUMENTS

| CN | 101860481 A | 10/2010 |
| JP | 107-231322 A | 8/1995 |
| (Continued) | | |

OTHER PUBLICATIONS

Ramaswami, Rajiv, "Design of Logical Topologies for Wavelength-Routed Optical Networks", IEEE Journal on Selected Areas of Communications, vol. 14 No. 5, Jun. 1996 (Year: 1996).*

(Continued)

*Primary Examiner* — Jenkey Van
(74) *Attorney, Agent, or Firm* — Sughrue Mion, PLLC

(57) ABSTRACT

In a multi-layer network, a control load in the upper layer network increases, and the usage efficiency and the reliability of the entire network decrease; therefore, a multi-layer network system according to an exemplary aspect of the present invention includes a first network manager configured to set a logical path in a first network layer; and a second network manager configured to set a physical path corresponding to the logical path, in a second network layer, wherein the second network manager includes a network information storage configured to store physical network information including physical route information and transmission characteristic information on the second network layer, and the first network manager sets the logical path based on the physical network information.

7 Claims, 9 Drawing Sheets

(51) Int. Cl.
*H04B 10/079* (2013.01)
*H04J 14/02* (2006.01)
*H04L 12/437* (2006.01)

(52) U.S. Cl.
CPC ........ *H04J 14/0257* (2013.01); *H04L 12/437* (2013.01); *H04J 14/02* (2013.01)

(56) References Cited

U.S. PATENT DOCUMENTS

| | | | |
|---|---|---|---|
| 2004/0042406 A1* | 3/2004 | Wu | H04L 45/22 370/238 |
| 2004/0205237 A1 | 10/2004 | Doshi et al. | |
| 2005/0270986 A1* | 12/2005 | Watanabe | H04L 41/12 370/252 |
| 2006/0023641 A1 | 2/2006 | Nakajima et al. | |
| 2008/0225723 A1 | 9/2008 | Lee et al. | |
| 2009/0232029 A1* | 9/2009 | Abu-Hamdeh | H04L 41/0803 370/254 |
| 2012/0093030 A1* | 4/2012 | Kim | H04L 45/64 370/254 |
| 2013/0242804 A1 | 9/2013 | Yabusaki et al. | |
| 2014/0099119 A1* | 4/2014 | Wei | H04J 14/0267 398/79 |
| 2014/0126355 A1 | 5/2014 | Filsfils et al. | |
| 2014/0255035 A1 | 9/2014 | Cao | |
| 2014/0328587 A1* | 11/2014 | Magri | H04J 14/0257 398/34 |
| 2015/0256253 A1* | 9/2015 | Bottari | H04B 10/0795 398/28 |
| 2017/0012871 A1* | 1/2017 | Iovanna | H04L 41/12 |

FOREIGN PATENT DOCUMENTS

| | | |
|---|---|---|
| JP | 2004-228740 A | 8/2004 |
| JP | 2004-260231 A | 9/2004 |
| JP | 2004-341767 A | 12/2004 |
| JP | 2006-042279 A | 2/2006 |
| JP | 2007-259272 | 10/2007 |
| JP | 2008-211551 A | 9/2008 |
| JP | 2013-009264 A | 1/2013 |
| JP | 2013-191942 A | 9/2013 |
| JP | 2013-247410 A | 12/2013 |
| JP | 2014-175820 A | 9/2014 |
| WO | 2014/054281 A1 | 4/2014 |

OTHER PUBLICATIONS

International Search Report for PCT Application No. PCT/JP2015/006247 mailed on Mar. 1, 2016.
English translation of Written opinion for PCT Application No. PCT/JP2015/006247 mailed on Mar. 1, 2016.
Japanese Office Action for JP Application No. 2019-156470 mailed on Jul. 14, 2020 with English Translation.
Japanese Office Action for JP Application No. 2019-156470 mailed on Dec. 21, 2021 with English Translation.
Japanese Office Action for Application No. 2021-078906, mailed on Feb. 8, 2022.

* cited by examiner

MULTI-LAYER NETWORK SYSTEM AND PATH SETTING METHOD IN MULTI-LAYER NETWORK

The present application is a Continuation application of Ser. No. 15/537,501 filed on Jun. 19, 2017, which is a National Stage Entry of PCT/JP2015/006247 filed on Dec. 15, 2015, which claims priority from Japanese Patent Application 2014-259792 filed on Dec. 24, 2014, the contents of all of which are incorporated herein by reference, in their entirety.

TECHNICAL FIELD

The present invention relates to multi-layer network systems and path setting methods in multi-layer networks, and in particular, to a multi-layer network system that is composed of a plurality of network layers including an optical network, and a path setting method in a multi-layer network.

BACKGROUND ART

Because of rapid expansion of mobile traffic and video services, there is a demand for increasing a communication capacity in a core network. The demand for increasing the capacity tends to continue in the future. In order to continuously increase the communication capacity at a limited cost, it is effective to improve usage efficiency of the network by efficiently operating resources of the network. In addition, it is important to increase fault resistance so as to avoid interruptions in service due to occurrence of an unexpected fault.

The current communication network is separated, with respect to each function, into a plurality of layers, each of which is managed and operated. Such a communication network can be considered to be a multi-layer network that is a combination of a packet network in an upper layer and an optical network in a lower layer, for example.

In the packet network as the upper layer, IP (Internet Protocol) technologies, MPLS (Multi-Protocol Label Switching) technologies, and the like are used, for example. The packet network is characterized in that various communication protocols can be used, and in that the network can be dynamically controlled by handling the network logically with fine traffic granularity. The dynamic control enables the improvement in network usage efficiency.

In the optical network as the lower layer, Wavelength Division Multiplexing (WDM) technologies are used. The optical network is suitable for treating traffic collectively with a large granularity such as a long-haul transmission and a large-capacity transmission. The optical network is characterized in that physical information such as an S/N (signal to noise) ratio of a communication line can be obtained directly. On the other hand, because there are limitations due to natural laws, the number of factors that can be dynamically controlled is small compared with that in the upper layer network, and the optical network is statically operated and managed substantially. In the multi-layer network, if a fault occurs in the lower layer network, the fault affects the upper layer network; accordingly, the lower layer network requires high reliability.

An example of topology design devices is described Patent Literature 1 that is used for network topology design of the multi-layer network. The topology design device in Patent Literature 1 includes a logical topology designing means, a lower layer path allocating means, a reliability evaluating means, and a lower layer path accommodation change designing means.

The logical topology designing means designs a logical topology of the upper layer, based on topology information representing the physical connection of a network to be designed, topology information representing which node is coupled to another node in the upper layer with a logical link, and information on the traffic amount occurring between certain nodes.

The lower layer path allocating means allocates a lower layer path representing a path in the lower layer to the designed logical topology.

The reliability evaluating means evaluates whether or not the designed logical topology satisfies a reliability condition showing a condition for ensuring reachability between respective nodes in the upper layer when a fault occurs in any one of physical links and nodes in the lower layer. The lower layer path accommodation change designing means designs an accommodation change of the lower layer path so as to satisfy the reliability condition by changing nodes through which the lower layer path passes without changing an end point of the allocated lower layer path when the designed logical topology does not satisfy the reliability condition.

It is said that the configuration described above makes it possible to ensure reachability between respective nodes of the upper layer and design a logical topology with high accommodation efficiency even when a fault occurs in a physical link or a node in the lower layer.

There are related technologies described in Patent Literature 2 to Patent Literature 5.

CITATION LIST

Patent Literature

[PTL 1] Japanese Unexamined Patent Application Publication No. 2008-211551
[PTL 2] Japanese Unexamined Patent Application Publication No. 2013-191942
[PTL 3] Japanese Unexamined Patent Application Publication No. 2013-009264
[PTL 4] Japanese Unexamined Patent Application Publication No. 2006-042279
[PTL 5] Japanese Unexamined Patent Application Publication No. 2004-228740

SUMMARY OF INVENTION

Technical Problem

As described above, only static operation and management have been performed in the lower layer network until now. However, recent advances in digital coherent technologies improve dynamic controllability also in the optical network as the lower layer. Accordingly, it has become possible to operate and manage the lower layer network dynamically. It is expected to improve usage efficiency of the network by utilizing the characteristics of network functions of the lower layer.

On the other hand, in the upper layer that uses the IP, the MPLS, or the like and that constitutes the multi-layer network, an enormous amount of path control management processing is required, such as processing for generating, deleting, and reconfiguring a logical path depending on a communication traffic demand, and processing for ensuring connectivity of the logical path. In addition to the above-mentioned major processing, it is also performed to manage and control route setting information and transmission characteristic information on an optical path in the optical network layer of a physical communication route by collecting information from the lower layer, which results in a huge amount of processing. At this time, if there are contradictions between physical information on the lower layer that the upper layer collects and a current state of the lower layer, the usage efficiency and the reliability of the network decrease.

As described above, there has been the problem that, in a multi-layer network including an upper layer network and a lower layer network, a control load in the upper layer network increases, and the usage efficiency and the reliability of the entire network decrease.

The object of the present invention is to provide a multi-layer network system and a path setting method in a multi-layer network that solve the above-mentioned problem.

Solution to Problem

A multi-layer network system according to an exemplary aspect of the present invention includes a first network manager configured to set a logical path in a first network layer; and a second network manager configured to set a physical path corresponding to the logical path, in a second network layer, wherein the second network manager includes a network information storage configured to store physical network information including physical route information and transmission characteristic information on the second network layer, and the first network manager sets the logical path based on the physical network information.

A path setting method in a multi-layer network according to an exemplary aspect of the present invention includes acquiring physical network information on a second network layer before setting a logical path in a first network layer constituting a multi-layer network, the second network layer being a network layer constituting the multi-layer network, in which a physical path corresponding to the logical path being set, and the physical network information including physical route information and transmission characteristic information; and setting the logical path based on the physical network information.

Advantageous Effects of Invention

According to a multi-layer network system and a path setting method in a multi-layer network of the present invention, it is possible to decrease a control load in an upper layer network and configure a multi-layer network with high usage efficiency and high reliability.

EXAMPLE EMBODIMENT

Figure 1:
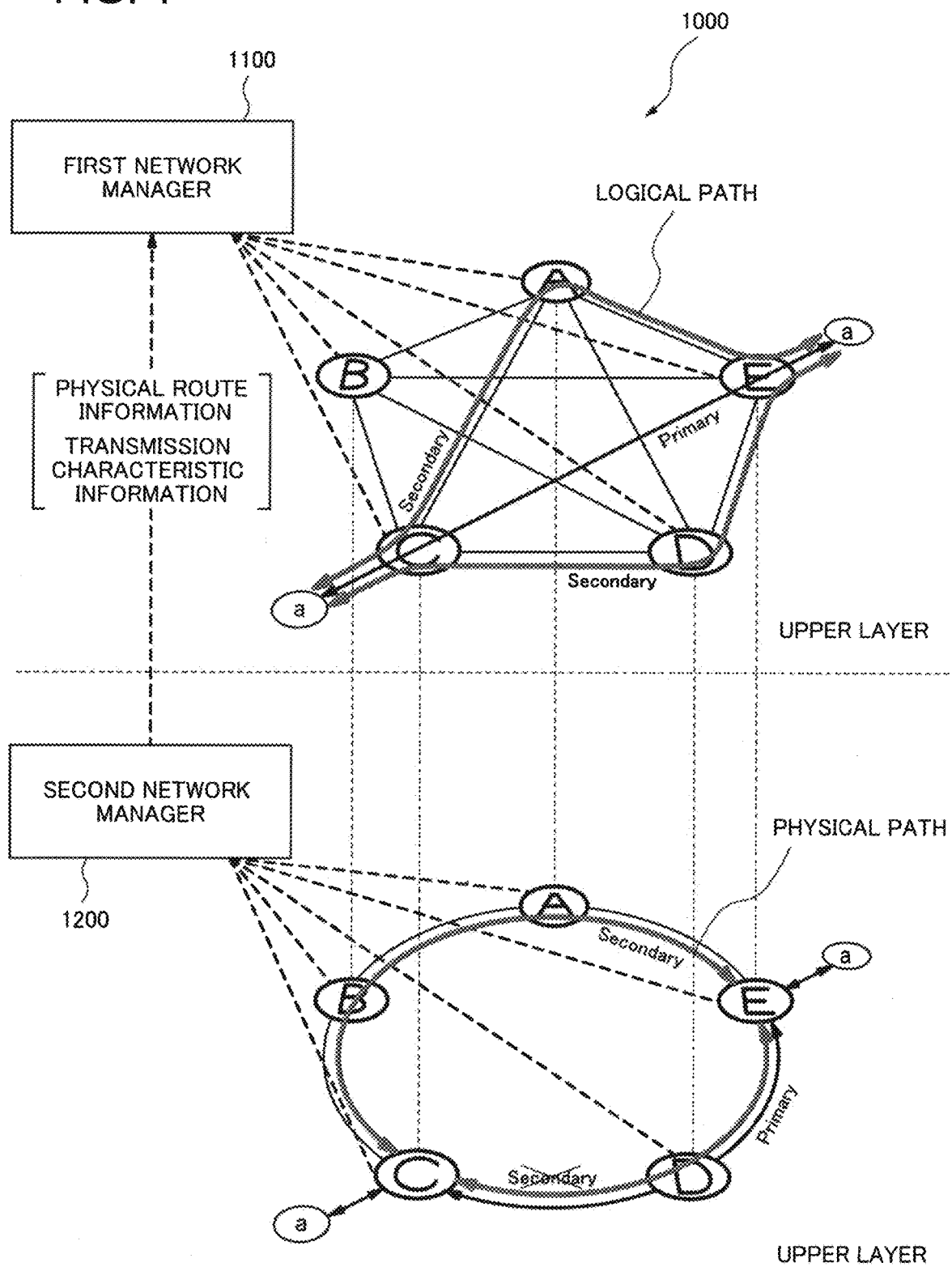
FIG. 1 is a block diagram schematically illustrating a configuration of a multi-layer network system according to a first example embodiment of the present invention.

Example embodiments of the present invention will be described below with reference to the drawings. The directions of arrows in the drawings are illustrated by way of example and are not intended to limit the directions of signals between blocks.

First Example Embodiment

FIG. 1 is a block diagram schematically illustrating a configuration of a multi-layer network system 1000 according to a first example embodiment of the present invention.

The multi-layer network system 1000 includes a first network manager 1100 and a second network manager 1200. The first network manager 1100 sets a logical path in a first network layer (an upper layer). The second network manager 1200 sets a physical path corresponding to the logical path in a second network layer (a lower layer).

Figure 2:
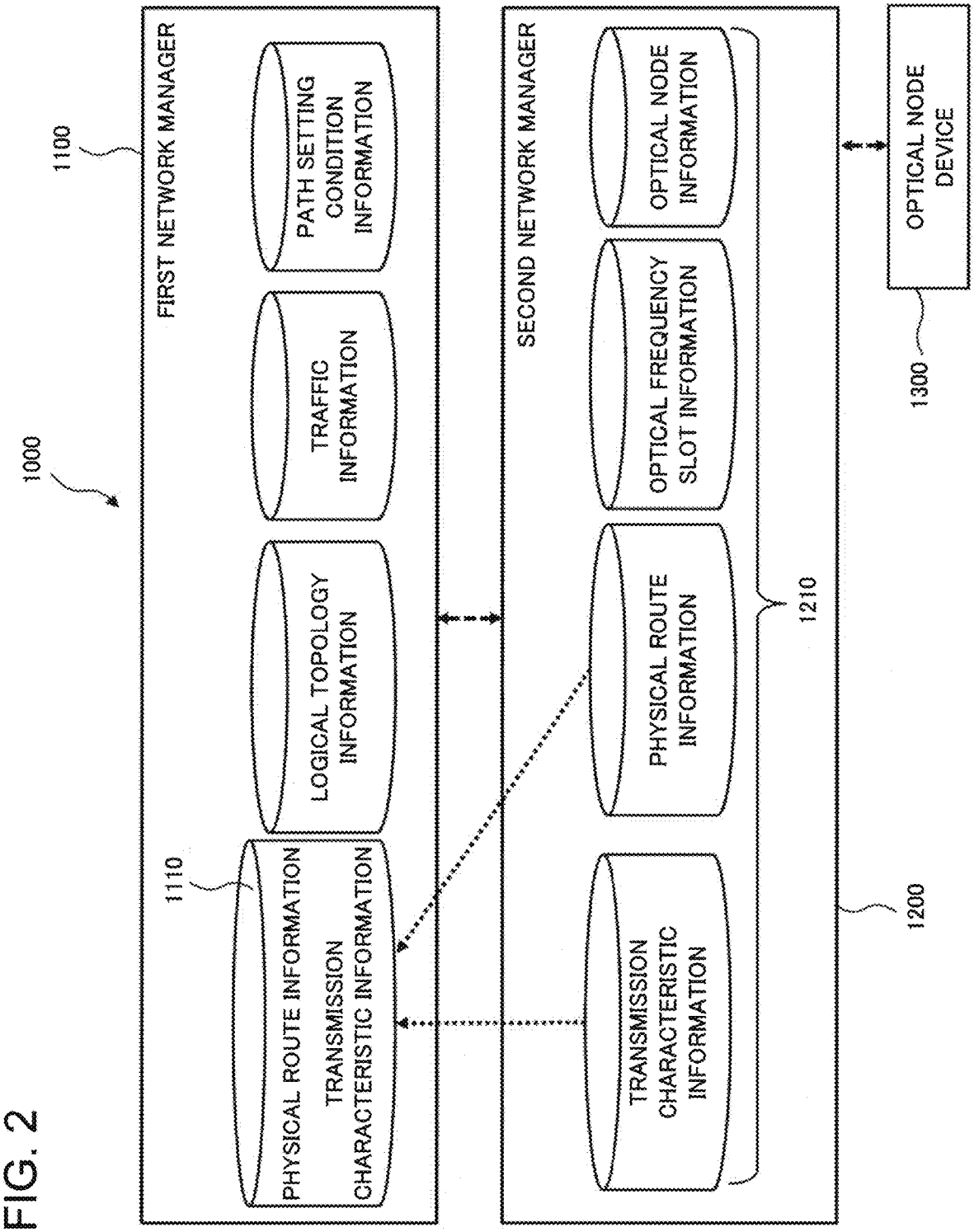
FIG. 2 is a block diagram illustrating a configuration of a multi-layer network system according to example embodiments of the present invention.

As illustrated in FIG. 2, the second network manager 1200 includes a network information storage 1210 that stores physical network information including physical route information and transmission characteristic information on the second network layer (lower layer). The first network manager 1100 sets the logical path based on the physical network information. In this case, the first network manager 1100 can be configured to include an acquired information storage 1110 that stores the physical network information acquired from the second network manager 1200.

Thus the multi-layer network system 1000 according to the present example embodiment has a configuration in which the first network manager 1100 sets the logical path based on the physical network information on the second network layer (lower layer). This makes it possible to reduce the number of paths to be searched when the first network manager 1100 searches logical paths. As a result, according to the multi-layer network system 1000 of the present example embodiment, it is possible to decrease a control load in the first network layer (upper layer network) and configure a multi-layer network with high usage efficiency and high reliability.

Next, the operation of the multi-layer network system 1000 according to the present example embodiment will be described with reference to a flowchart illustrated in FIG. 3.

A hierarchized multi-layer network with an upper layer and a lower layer each of which is composed of five nodes (A to E) as illustrated in FIG. 1 will be described as an example. The upper layer is a logical layer using the IP technology or the MPLS technology, and the lower layer is a physical layer using the optical transmission technology.

Referring to FIG. 1, the nodes A to E constitute a ring network in which the nodes are physically connected in a ring pattern. At this time, a physical topology that a lower layer NMS (network management system) serving as the second network manager 1200 recognizes is a ring network. On the other hand, the nodes A to E form a mesh network logically in which the nodes are connected in a mesh pattern. Consequently, the logical topology that the upper layer NMS serving as the first network manager 1100 recognizes is a mesh network.

A case will now be described where a traffic demand arises between the node C and the node E (step S110 in FIG. 3). In this case, the upper layer NMS and the lower layer NMS search for a shortest path as a path that connects the nodes.

Because the lower layer is a ring network, there are two ways for the path to connect the node C and the node E, that is, "C← →D← →E" and "C← →B← →A← →E". Accordingly, the physically shortest path is a physical path 1 composed of "C← →D← →E".

Because the upper layer is a mesh network, there are 16 ways in total for the path to connect the node C and the node E under the condition that a path does not pass through the same node twice or more. The logically shortest path among these paths is a logical path 1 composed of "C← →E".

Although the physical path 1 "C← →D← →E" includes a transfer point of the node D, the logical path 1 "C← →E" directly connects the node C and the node E. A real communication channel (communication cable) corresponds to the physical path 1. However, because the upper layer NMS can recognize the logical path 1 only, it is impossible for the upper layer NMS to understand the situation that the path is relayed by the node D.

However, the multi-layer network system 1000 according to the present example embodiment has a configuration in which the upper layer NMS (first network manager 1100) sets the logical path based on the physical route information (physical topology information), as described above. The upper layer NMS can be configured to acquire the physical topology information on the lower layer in advance from the lower layer NMS before performing a path search (step S120).

Specifically, with respect to the logical path to connect the node C and the node E, a following condition is added: a condition A "including the node D and including neither the node A nor the node B", or a condition B "including the node A and the node B, and not including the node D". In this case, there are three ways in total including one way of "C← →D← →E" for the logical path satisfying the condition A, and two ways of "C← →A← →B← →E" and "C← →B← →A← →E" for the logical path satisfying the condition B. Therefore, adding the above-described conditions enables the number of candidates for the logically shortest path to be decreased from 16 to 3. As a result, according to the multi-layer network system 1000 of the present example embodiment, it is possible to reduce the time required to determine the logical path 1.

Thus the upper layer NMS (first network manager 1100) selects candidates for the logical path based on the physical route information (condition A or B) (step S130). The logical path can be determined from among the candidates for the logical path based on the physical route information and the transmission characteristic information (step S140). The transmission characteristic information includes at least one of an optical signal-to-noise ratio (OSNR), a physical path length, and a signal quality.

On the other hand, the lower layer NMS determines the physical path 1 to accommodate the logical path 1 determined by the upper layer NMS (step S150). Because the upper layer NMS and the lower layer NMS use the same topology and the same path search method, the physical path 1 necessarily corresponds to the logical path 1. This eliminates the need for searching the physical path 1 again after searching the logical path 1. As a result, it is possible to reduce the total time required to determine the logical path and the physical path that are necessary for establishing traffic communication and to establish the traffic communication rapidly.

In addition, it will be specified to set a redundant system path (secondary path) when the logical path 1 is used as an operational system path (primary path).

In this case, when searching for a shortest logical path, the following candidates are obtained: a logical redundant system path 1 "C← →D← →E" and a logical redundant system path 2 "C← →A← →E". However, on the physical topology, the logical path 1 "C← →E" is identical to the logical redundant system path 1 "C← →D← →E". Accordingly, if the upper layer NMS does not acquire the physical topology information, there is a 50% probability of selecting the logical redundant system path 1 including the node D as the redundant system path, judging from the path length only.

If a fault arises in the physical path 1 "C← →D← →E", a fault also arises in the logical path 1 "C← →E". A case will be considered where the upper layer NMS intends to divert the traffic onto the logical redundant system path 1 "C← →D← →E" that has been previously determined before the fault arises. In this case, the upper layer NMS requests the lower layer NMS to create a physical path to accommodate the logical redundant system path 1. However, as mentioned above, because the logical path 1 "C← →E" is identical to the logical redundant system path 1 "C← →D← →E" on the physical topology, the lower layer NMS fails in creating the physical redundant system path 1 to accommodate the logical redundant system path 1.

In this case, the upper layer NMS searches once again for a redundant system path that is different from the logical redundant system path 1. The shortest redundant system path different from the logical redundant system path 1 "C← →D← →E" includes the above-mentioned logical redundant system path 2 "C← →A← →E". The logical redundant system path 2 differs from the logical path 1 "C← →E" also in the physical topology. Therefore, the lower layer NMS never fails in creating a physical redundant system path after searching again.

However, in the multi-layer network system 1000 according to the present example embodiment, the upper layer NMS is configured to search for a logical path after acquiring the physical topology information in advance; therefore, it is possible to prevent the above-mentioned re-search operation. This makes it possible to reduce the probability of failing in fault recovery upon occurrence of physical failure in the network, and to enhance the reliability of the network.

To establish the traffic communication, it is necessary to establish communication controlling communication equipment after determining the logical path and the physical path. Accordingly, the lower layer NMS checks the allocated situation of optical frequency slots in the optical fiber used for the physical path 1 in order to create the physical path 1 "C← →D← →E". At this time, the lower layer NMS refers to optical frequency slot information preliminarily stored in the network information storage 1210 (see FIG. 2), and understands an unoccupied situation of the optical frequency slots in the optical network that is the lower layer network.

Figure 3:
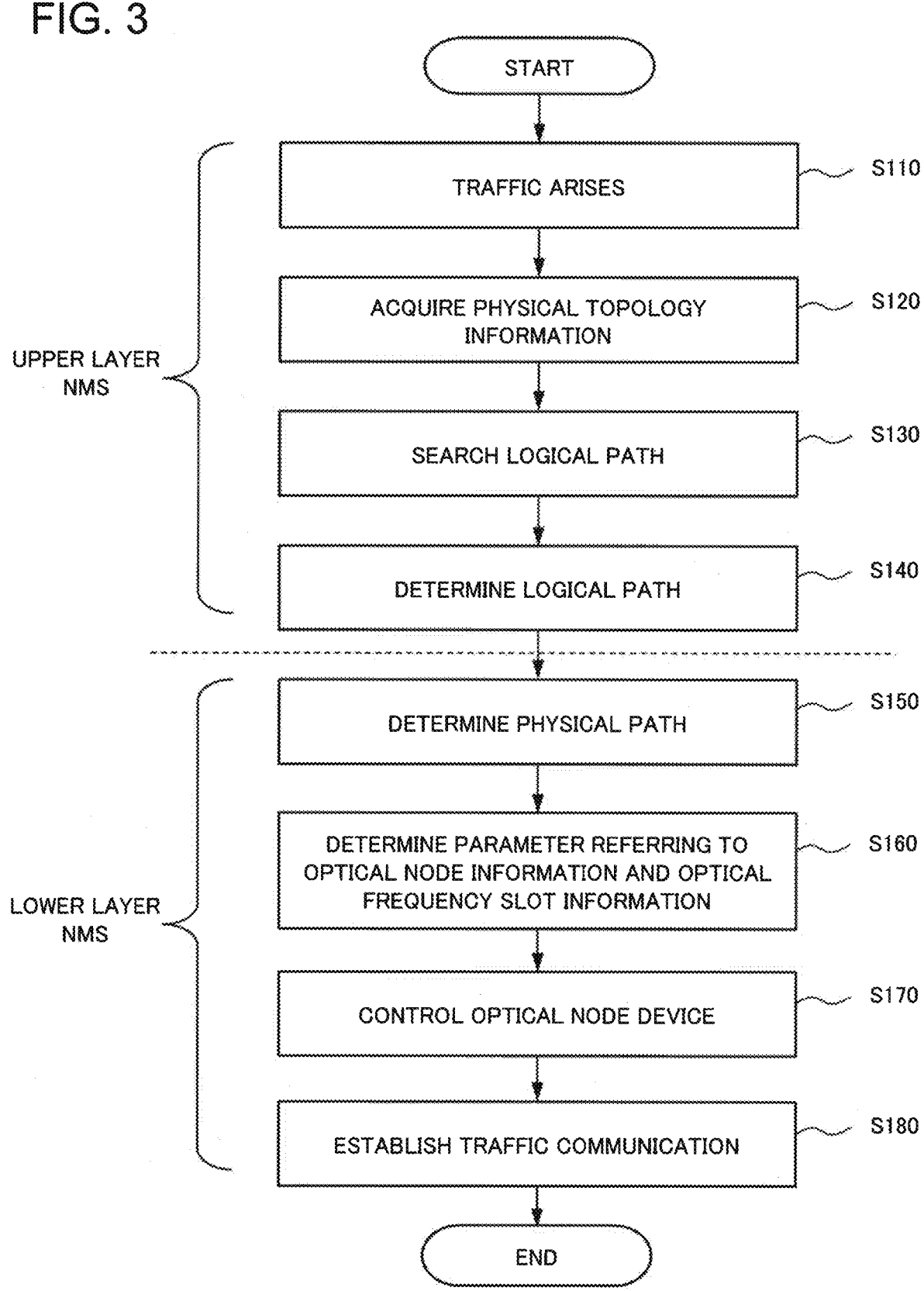
FIG. 3 is a flowchart to describe an operation of a multi-layer network system according to the first example embodiment of the present invention.

The lower layer NMS determines optical transmission parameters such as an optical modulation method and the number of carriers depending on the unoccupied situation of the optical frequency slots (step S160 in FIG. 3). At this time, the lower layer NMS refers to the optical node information stored in the optical node information storage included in the network information storage 1210. The optical node information is information on the specifications of the optical node device 1300 that is connected to an optical network. The lower layer NMS controls the optical node device 1300 so as to configure a physical path based on the optical node information and the optical frequency slot information (step S170). Specifically, the lower layer NMS controls the optical node device 1300 based on the determined optical transmission parameter. This enables the lower layer NMS to implement the determined logical path and physical path and the traffic communication to be established (step S180).

Specifically, the lower layer NMS determines the number of optical frequency slots and the number of carriers to be allocated to the physical path using the optical frequency slot information that is acquired in advance. The lower layer NMS sets the optical transmission parameter resulting from the determination in the optical node device that is included in each of the node C, the node D, and the node E that are associated with the physical path 1, by which the lower layer NMS forms the physical path 1. This makes the traffic communication established.

Next, a path setting method in a multi-layer network according to the present example embodiment will be described.

In the path setting method in the multi-layer network according to the present example embodiment, first, physical network information on a second network layer is acquired before a logical path is set in a first network layer composing a multi-layer network. The second network layer is a network layer that composes the multi-layer network and a network layer in which a physical path corresponding to the logical path is set. The physical network information includes physical route information and transmission characteristic information. In the path setting method in the multi-layer network according to the present example embodiment, the logical path is set based on the physical network information.

Candidate for the logical path can be selected based on the physical route information, and the logical path can be determined from among the candidates for the logical path based on the physical route information and the transmission characteristic information.

As described above, according to the multi-layer network system 1000 and the path setting method in the multi-layer network of the present example embodiment, it is possible to decrease a control load in the upper layer network. This makes it possible to configure a multi-layer network with high usage efficiency and high reliability.

Second Example Embodiment

Figure 4:
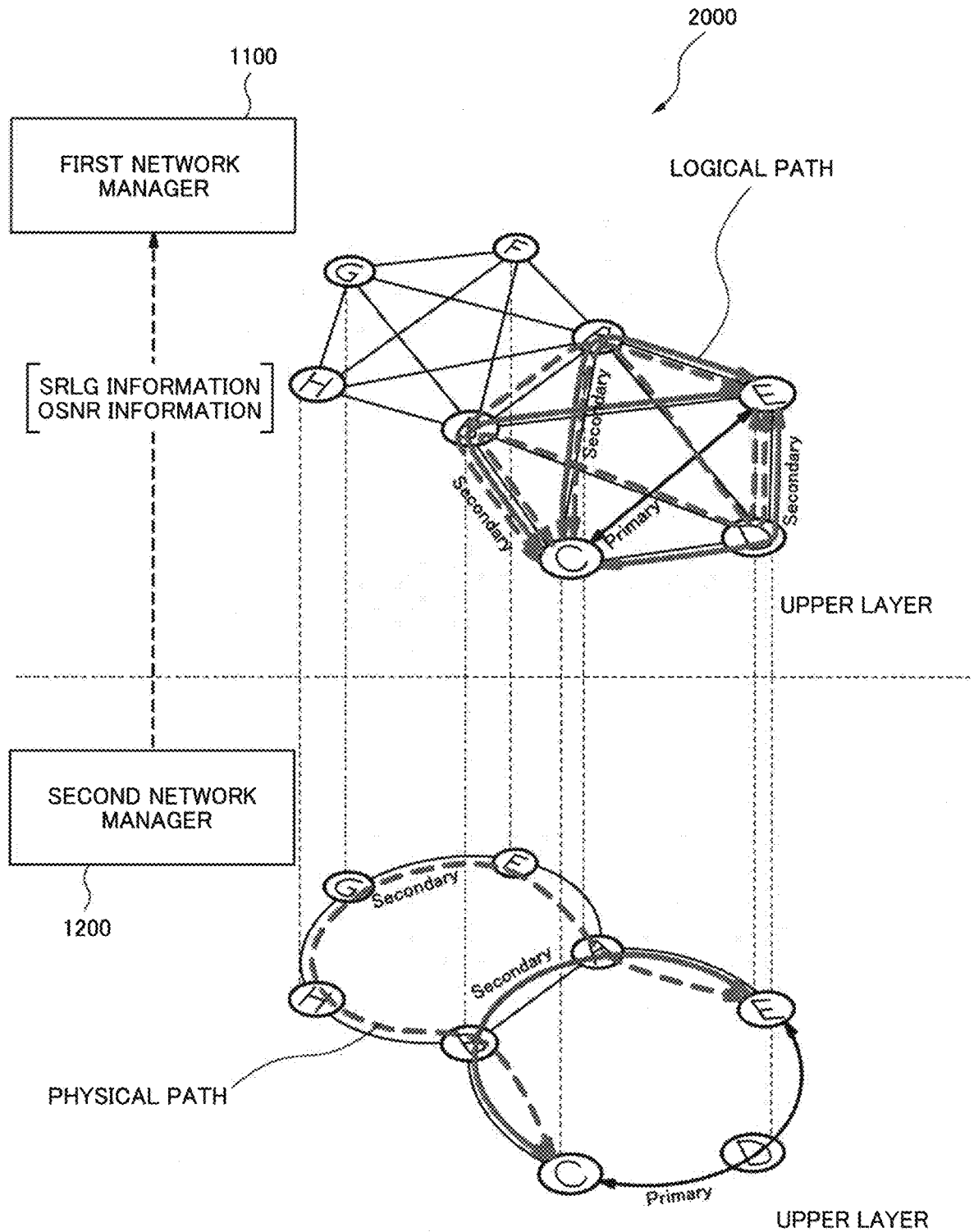
FIG. 4 is a block diagram schematically illustrating a configuration of a multi-layer network system according to a second example embodiment of the present invention.

Next, a second example embodiment of the present invention will be described. FIG. 4 schematically illustrates a configuration of a multi-layer network system 2000 according to the present example embodiment.

The configurations of the first network manager 1100 and the second network manager 1200 included in the multi-layer network system 2000 according to the present example embodiment are similar to those of the first example embodiment (see FIG. 2).

In the present example embodiment, each of a logical path set by the first network manager 1100 and a physical path set by the second network manager 1200 is a redundant system path corresponding to an operational system path. The first network manager 1100 is configured to calculate a shared link cost that is a cost for the logical path with respect to each candidate for the logical path from shared link information on the redundant system path included in the physical route information, and to determine the logical path based on the shared link cost and the transmission characteristic information.

The shared link information means a set of links that share the same risk including not only a logical link but also a physical link, and information on an extended shared risk link group. The "shared link information" is referred to simply as "SRLG" below. The transmission characteristic information includes at least one of an optical signal to noise ratio (OSNR), a physical path length, and a signal quality.

Next, the operation of the multi-layer network system 2000 according to the present example embodiment will be described in detail with reference to FIG. 4.

In the present example embodiment, as illustrated in FIG. 4, a network will be described as an example that is configured by connecting two networks each of which is composed of five nodes described in the first example embodiment with reference to FIG. 1. Specifically, the upper layer is a logical layer that is configured by connecting two mesh networks each of which is composed of five nodes. The lower layer is a physical layer configured by connecting two ring networks each of which is composed of five nodes. A case will be described below as an example where SRLG is used as physical route information (physical topology information) and OSNR is used as transmission characteristic information. Descriptions of common operations with the multi-layer network system 1000 according to the first example embodiment are not repeated.

An operation will be described in which the first network manager 1100 calculates the shared link cost (SRLG cost) of a path. An SRLG cost $C_{path}$ for each path can be obtained by adding up SRLG costs $C_{link}$ (SRLG) for each link constituting the path. That is to say, the SRLG cost for each path $C_{path}$ is calculated using the following formula (1).

$$C_{path} = \sum^{path} C_{link}(SRLG) \tag{1}$$

First, a case will be described where the first network manager 1100 calculates a cost without acquiring the physical topology information. Using as an example an operation to select a logical redundant path for the logical path 1 "C←

"→E" that connects the node C and the node E, it is assumed that a search for a logical redundant path is performed up to four hops for simplicity.

As a candidate for the logical redundant path, there are logical redundant path 1 "C← →A← →E", logical redundant path 2 "C← →B← →E", and logical redundant path 3 "C← →D← →E", for three hops. For four hops, there are logical redundant path 4 "C← →A← →D← →E", logical redundant path 5 "C← →B← →D← →E", and logical redundant path 6 "C← →B← →A← →E", and subsequent passes have five or more hops; accordingly, the descriptions thereof are omitted.

SRLG-1 to SRLG-3 represent SRLGs to which the logical redundant paths 1 to 3 belong, respectively. Referring to FIG. 4, with regard to SRLG-1, paths for which the link "C← →A" overlaps are logical redundant path 1 "C← →A← →E" and logical redundant path 4 "C← →A← →D← →E". In the link "A← →E", logical redundant path 1 "C← →A← →E" overlaps with logical redundant path 6 "C← →B← →A← →E".

With regard to SRLG-2, paths for which the link "C← →B" overlaps are logical redundant path 2 "C← →B← →E", logical redundant path 5 "C← →B← →D← →E" 5, and logical redundant path 6 "C← →B← →A← →E".

With regard to SRLG-3, paths for which the link "D← →E" overlaps are logical redundant path 3 "C← →D← →E", logical redundant path 4 "C← →A← →D← →E", and logical redundant path 5 "C← →B← →D← →E".

The logical redundant path 1 overlaps in the link "C← →A" once; accordingly, the SRLG cost is set at "+1". The logical redundant path 1 also overlaps in the link "A← →E" once; accordingly, the SRLG cost is set at "+1". Consequently, the SRLG cost of the entire logical redundant path 1 becomes "+2". Similarly, the logical redundant path 2 overlaps in the link "C← →B" twice; accordingly, the SRLG cost is set at "+2". The logical redundant path 2 does not overlap in the other link, that is, the link "B← →E"; accordingly, the SRLG cost of the entire path becomes "+2".

Figure 5:
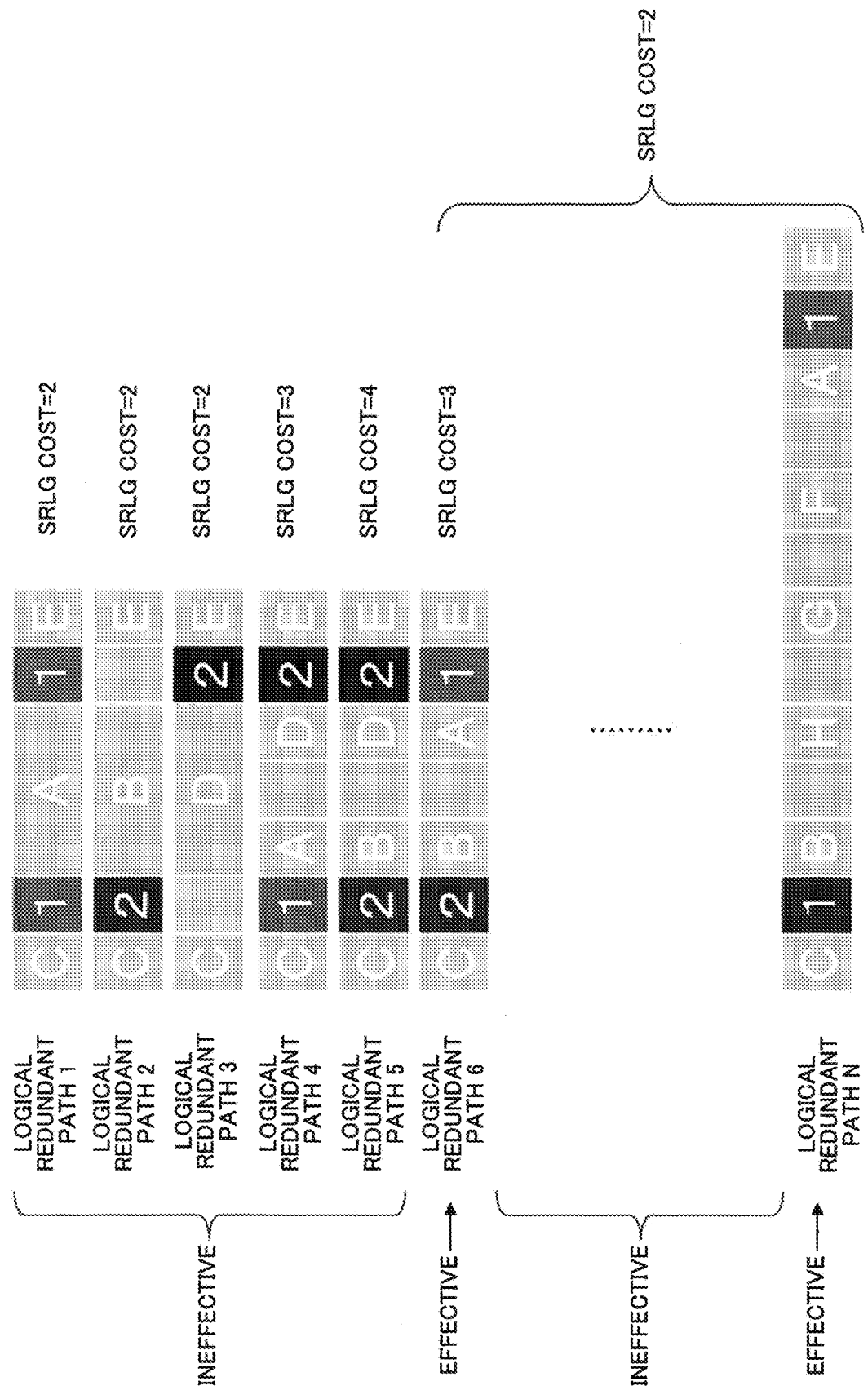
FIG. 5 is a diagram to describe an operation of a first network manager included in the multi-layer network system according to the second example embodiment of the present invention.

FIG. 5 summarizes the results with respect to each candidate for the logical redundant path. For example, when the maximum number of hops is set at "4", the logical redundant paths 1 to 3 have a minimum SRLG cost among the logical redundant system paths 1 to 6.

Next, a case will be described where the first network manager 1100 included in the multi-layer network system 2000 according to the present example embodiment acquires physical topology information and calculates a cost. Because of assuming the redundant system path, the physical topology information in this case indicates the condition B that is described in the first example embodiment, that is, the condition of "including the node A and the node B, and not including the node D".

An effective logical redundant path against a physical fault in the network is either the logical redundant path 6 "C← →B← →A← →E" or the logical redundant path N "C← →B← →H← →G← →F← →A← →E" from the acquired physical topology information. This makes it possible to eliminate the other ineffective logical redundant paths in the calculation of the SRLG cost from the cost calculation process where the above-mentioned physical topology information is not acquired. This enables the calculating process of the SRLG cost to be drastically simplified. Because the logical redundant path 6 overlaps with the logical redundant path N once in each of the link "C← →B" and the link "A← →E", the SRLG cost in this case is set at "+2" for each path.

As mentioned above, when there are a plurality of candidates for the logical redundant path with the same SRLG cost, the logical redundant path is determined using the OSNR information serving as the transmission characteristic information. Acquiring the OSNR information enables the upper layer NMS (first network manager 1100) to understand that the OSNR necessary for implementing the logical redundant path 6 is smaller than the OSNR necessary for implementing the logical redundant path N. This enables the upper layer NMS to select the logical redundant path 6 as the redundant path for the logical path 1.

The required OSNR increases as the physical path length (physical path length) increases; accordingly, a path length may be used in place of the OSNR. Because the OSNR has a correlation with a Q-value that represents a signal quality, a Q-value can be used as the transmission characteristic information.

As described above, according to the multi-layer network system 2000 of the present example embodiment, it is possible to decrease a control load in the upper layer network and configure a multi-layer network with high usage efficiency and high reliability.

Third Example Embodiment

Next, a third example embodiment of the present invention will be described. The configuration of a multi-layer network system according to the present example embodiment is similar to that of the multi-layer network system 2000 according to the second example embodiment illustrated in FIG. 4.

The second network layer (lower layer) constituting the multi-layer network system according to the present example embodiment is configured by an optical network. The second network manager 1200 includes an optical frequency information storage that stores optical frequency slot information indicating a usage situation of optical frequency slots in an optical network (see FIG. 2).

The second network manager 1200 according to the present example embodiment calculates an optical frequency slot number that indicates the number of optical frequency slots necessary for configuring the physical path determined by the transmission characteristic information. At this time, the first network manager 1100 acquires an optical frequency slot cost that is a cost to ensure the optical frequency slot number determined with respect to each candidate for the logical path based on the optical frequency slot information. The first network manager 1100 is configured to determine a logical path based on transmission characteristic information and a logical path cost that equals the sum of an optical frequency slot cost and a shared link cost (SRLG cost).

Next, the operations of the first network manager 1100 and the second network manager 1200 according to the present example embodiment will be described in detail.

Figure 6:
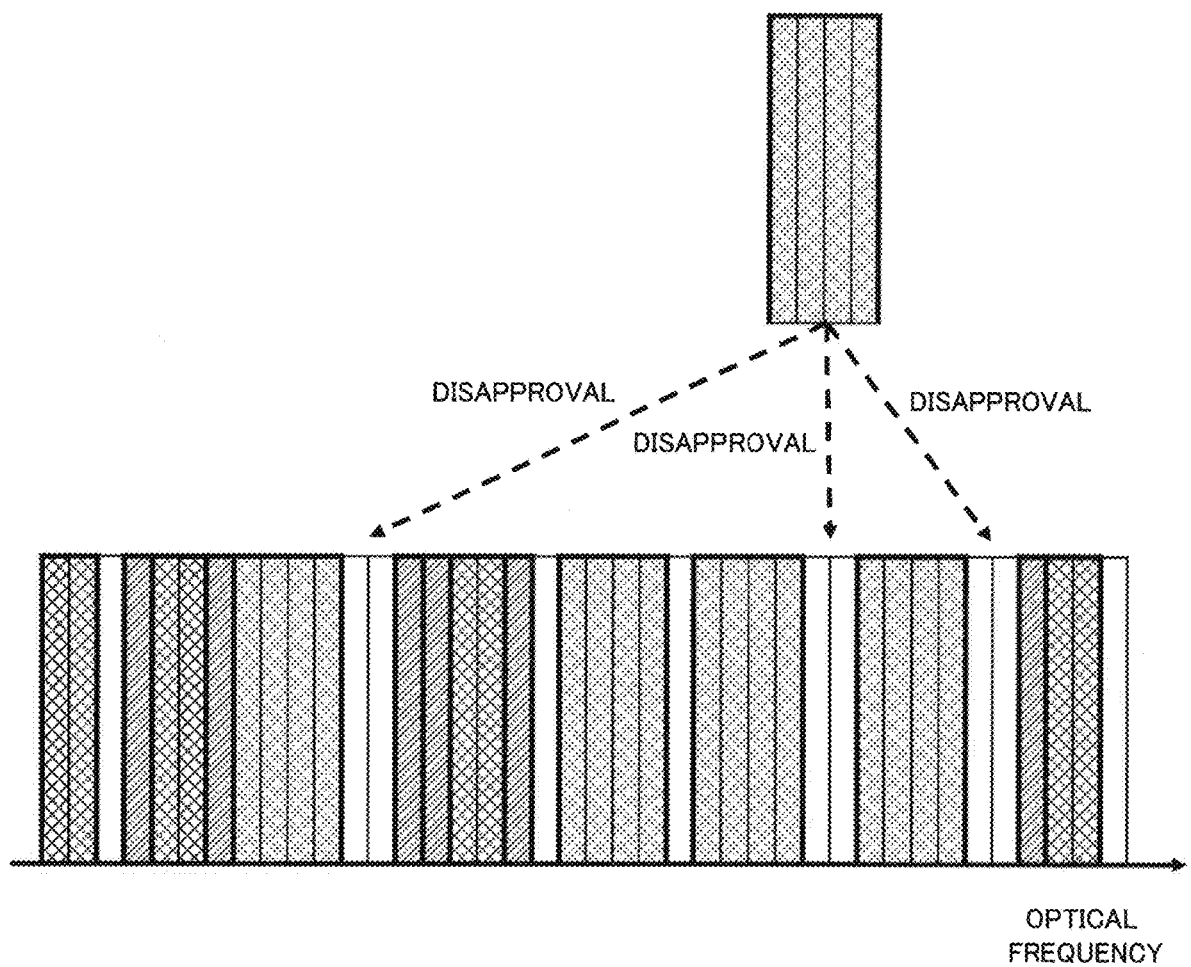
FIG. 6 is a diagram illustrating a usage situation of an optical frequency slot to explain an operation of a network manager constituting a multi-layer network system according to a third example embodiment of the present invention.
Figure 9:
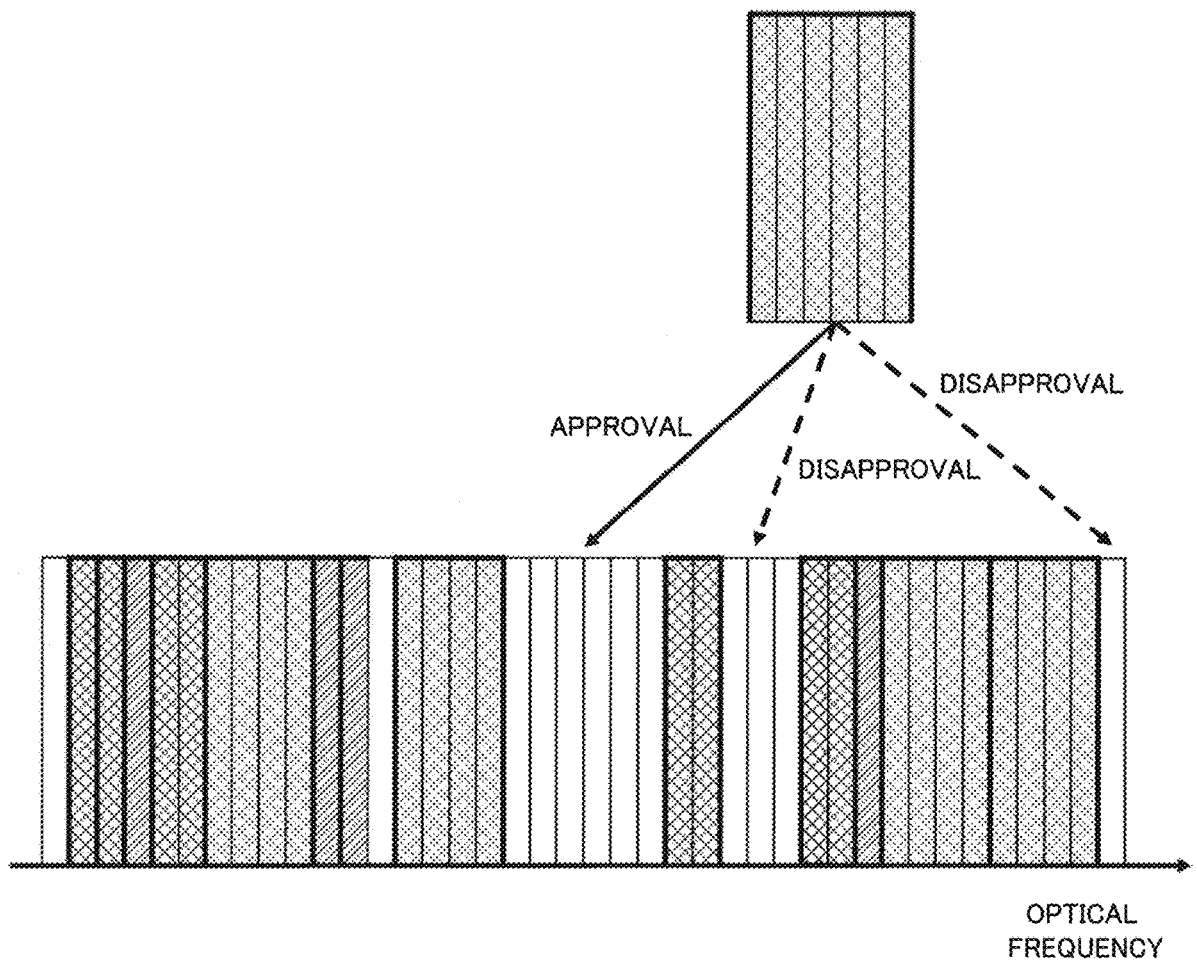
FIG. 9 is a diagram illustrating a usage situation of the optical frequency slot to explain the operation of the network manager constituting the multi-layer network system according to the third example embodiment of the present invention.

The lower layer NMS serving as the second network manager 1200 preliminarily stores, in the optical frequency information storage, optical frequency slot information that includes a usage situation of optical frequency slots in the optical network. The usage situation of optical frequency slots is a situation as illustrated in FIG. 6 in the link "B← →A", and a situation as illustrated in FIG. 9 in the link "B← →H← →G← →F← →A", for example. In these figures, each rectangular shape represents an optical frequency slot, and each white optical frequency slot represents an unoccupied slot that is not used.

The upper layer NMS serving as the first network manager 1100 calculates the SRLG cost using the shared link information (SRLG) and the OSNR information, with which in parallel, the lower layer NMS can calculate the optical frequency slot cost. This is because the upper layer NMS and the lower layer NMS share the topology information; consequently, each of them can independently calculate the cost in parallel. The optical frequency slot cost may be acquired as follows: the upper layer NMS receives the optical frequency slot information from the lower layer NMS, by which the upper layer NMS calculates the optical frequency slot cost.

As illustrated in FIG. 4, the candidates for the physical redundant path are physical redundant path 1 "C← →B← →A← →E" and physical redundant path 2 "C← →B← →H← →G← →F← →A← →E". The lower layer NMS preliminarily stores, as the optical node information, the fact that four optical frequency slots are required to implement the physical redundant path 1, and that six optical frequency slots are required to implement the physical redundant path 2. At this time, the number of required optical frequency slots is determined by the transmission characteristic information such as the path length and OSNR that the lower layer NMS holds.

Figure 7:
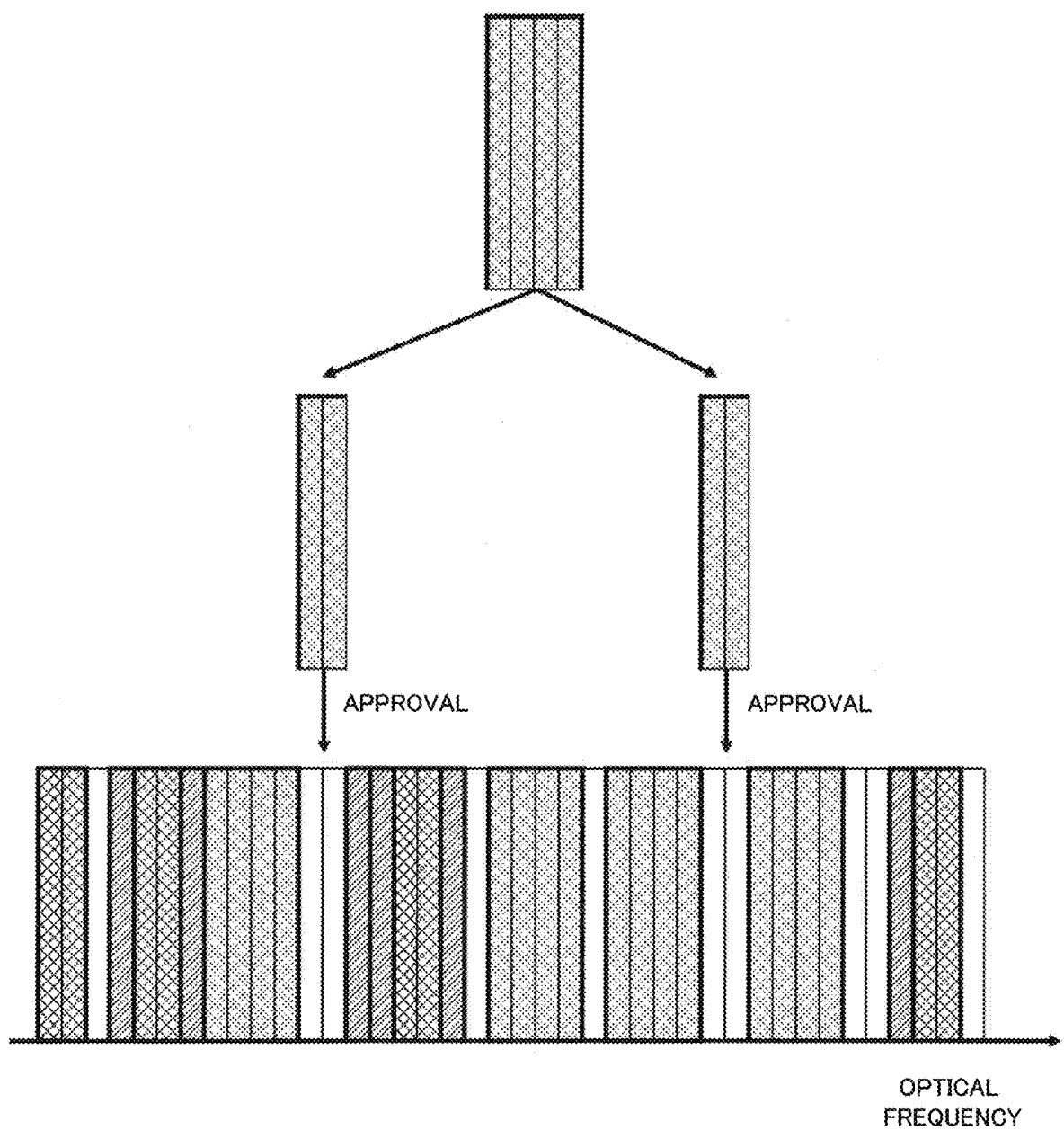
FIG. 7 is a diagram illustrating a usage situation of the optical frequency slot to explain the operation of the network manager constituting the multi-layer network system according to the third example embodiment of the present invention.
Figure 8:
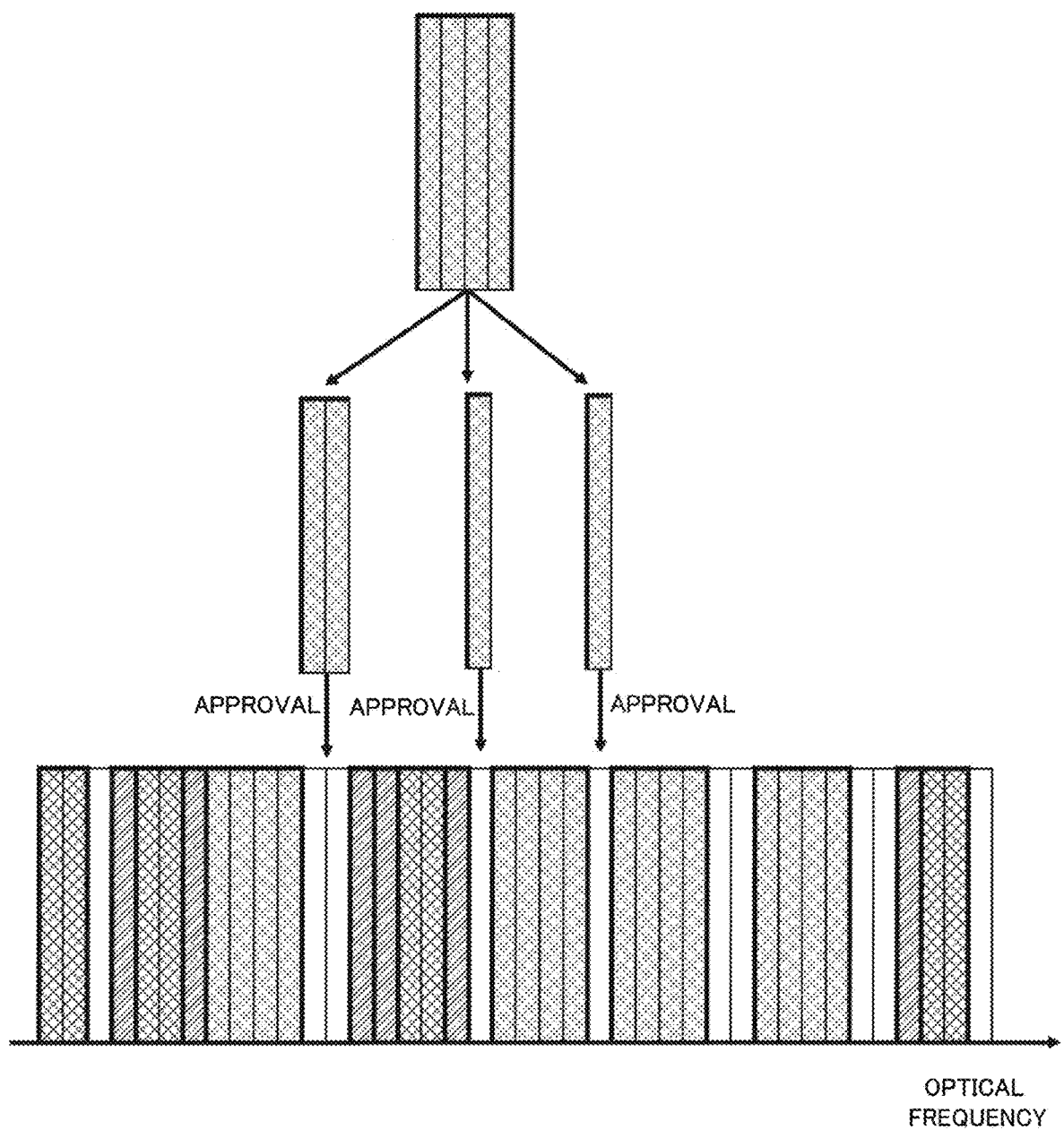
FIG. 8 is a diagram illustrating a usage situation of the optical frequency slot to explain the operation of the network manager constituting the multi-layer network system according to the third example embodiment of the present invention.

The usage situation of the optical frequency slots in the link "B← →A" that constitutes the physical redundant path 1 is illustrated in FIG. 6. The number of continuous unoccupied slots is up to two. Consequently, in order to implement the physical redundant path 1 that requires four optical frequency slots, it is necessary to divide the slots into two pieces of continuous 2 slots (2 slots×2) as illustrated in FIG. 7, for example. Alternatively, as illustrated in FIG. 8, there is a need to divide the slots into one of continuous 2 slots and two pieces of 1 slot (2 slot×1+1 slot×2).

In the case illustrated in FIG. 7, the number of times that the optical frequency slots are divided is one; accordingly, a cost to ensure the optical frequency slot number (optical frequency slot cost) is set at "+1". In the case illustrated in FIG. 8, the number of times that the optical frequency slots are divided is two; accordingly, the optical frequency slot cost is set at "+2".

On the other hand, the usage situation (unoccupied situation) of the optical frequency slots in the link "B← →H← →G← →F← →A" that constitutes the physical redundant path 2 is illustrated in FIG. 9. The number of continuous unoccupied slots is up to six. Consequently, it is possible to implement the physical redundant path 2 without dividing six optical frequency slots to be required. In this case, because the number of times of division necessary to ensure the optical frequency slot number is zero, the optical frequency slot cost is "0".

As mentioned above, an optical frequency slot cost $C_{path}$ for each path can be obtained by adding up optical frequency slot costs for each link $C_{link}$ (slot) that constitutes the path. That is to say, the optical frequency slot cost for each path $C_{path}$ can be calculated using the following formula (2).

$$C_{path} = \sum^{path} C_{link}(\text{slot}) \tag{2}$$

As the number of times that the optical frequency slots are divided increases, a timing gap such as a skew between the divided optical frequency slots arises, which is associated with a high probability of the occurrence of quality deterioration in the optical transmission. Accordingly, the smaller the number of times that the optical frequency slots are divided is, the better. As a result, in the above-mentioned example, the physical redundant path 1 is at a disadvantage because the optical frequency slot cost of the physical redundant path 1 is larger than that of the physical redundant path 2.

With a combination of the optical frequency slot cost and the SRLG cost described in the second example embodiment, the cost for each path $C_{path}$ that is obtained by adding up the respective costs as shown in the following formula (3) may also be used.

$$C_{path} = \sum^{path} (C_{link}(SRLG) + C_{link}(\text{slot})) \tag{3}$$

In the example described in the second example embodiment, the SRLG cost calculated by the upper layer NMS for the logical redundant path 1 corresponding to the physical redundant path 1 is equal to that for the logical redundant path 2 corresponding to the physical redundant path 2. Using the optical frequency slot cost together makes it possible to select the logical redundant path 2 "C← →B← →H← →G← →F← →A← →E" as the logical redundant path. If there are a plurality of candidates for the logical path each of which has the same cost calculated by formula (3), using further the transmission characteristic information such as an OSNR makes it possible to select a redundant system logical path.

The calculation of the SRLG cost and the optical frequency slot cost may be performed by the lower layer NMS, or the upper layer NMS may perform the calculation acquiring the physical network information from the lower layer NMS. Alternatively, the upper layer NMS and the lower layer NMS can share the calculation of those costs.

The present invention has been described by taking the exemplary embodiments described above as model examples. However, the present invention is not limited to the aforementioned exemplary embodiments. The present invention can be implemented in various modes that are apparent to those skilled in the art within the scope of the present invention.

This application is based upon and claims the benefit of priority from Japanese Patent Application No. 2014-259792, filed on Dec. 24, 2014, the disclosure of which is incorporated herein in its entirety by reference.

REFERENCE SIGNS LIST 1000, 2000 Multi-layer network system
1100 First network manager
1110 Acquired information storage
1200 Second network manager
1210 Network information storage
1300 Optical node device

The invention claimed is:
1. A packet network manager, comprising:
a first controller configured to set a logical path in a packet network; and
a receiver configured to:
receive physical network information including route information and signal quality information on an optical network, and
acquire and optical frequency slot cost that is a cost to ensure and number of optical frequency slot determined with respect to each candiate for the logical path based on optical frequency slot information that indicates a usage situation of the optical frequency slots in the optical network, wherein the first controller is configured to set the logical path corresponding to a physical path in the optical network based on the physical network information, select candidates for the logical path based on the route information, and determine the logical path from among the candidates for the logical path based on the route information, the signal quality information, and the optical frequency slot cost.

2. The packet network manager according to claim 1, wherein the receiver is further configured to receive the physical network information including redundant system path information and an optical signal-to-noise ratio on the optical network.

3. The packet network manager according to claim 1, wherein the first controller is further configured to set the logical path based on the signal quality information and a shared link cost that is a cost for the logical path and is calculated from shared link information included in the route information.

4. The packet network manager according to claim 1, further comprising a first memory configured to store the physical network information received by the receiver.

5. A system comprising:

a packet network manager;

an optical network manager, comprising:

a first controller configured to set a physical path in an optical network;

a first memory configured to store physical network information including route information and signal quality information on the optical network;

a transmitter configured to transmit the physical network information to the packet network manager; and a second memory configured to store optical frequency slot information indicating a usage situation of optical frequency slots in the optical network, wherein the first controller is further configured to calculate a number of optical frequency slot indicating a number of optical frequency slots in the optical network necessary for configuring the physical path determined by the signal quality information, and acquire an optical frequency slot cost that is a cost to ensure the number of optical frequency slots; and wherein the packet network manager is configured to set a logical path correspoding to the physical path based on the physical network information and the optical frequency slot cost.

6. The system according to claim 5, wherein the first memory is further configured to store the physical network information including redundant system path information and an optical signal-to-noise ratio on the optical network.

7. The system according to claim 5, further comprising a third memory configured to store optical node information on a specification of an optical node connected to the optical network, wherein the optical network manager is configured to control the optical node in such a way as to configure the physical path based on at least the optical node information.

* * * * *